(12) United States Patent
Thubert et al.

(10) Patent No.: US 11,108,678 B2
(45) Date of Patent: Aug. 31, 2021

(54) INSPIRED PATH COMPUTATION IN A NETWORK

(71) Applicant: Cisco Technology, Inc., San Jose, CA (US)

(72) Inventors: Pascal Thubert, La Colle sur Loup (FR); Enzo Fenoglio, Issy-les-Moulineaux (FR); Jean-Philippe Vasseur, Saint Martin d'uriage (FR); Hugo Latapie, Long Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 575 days.

(21) Appl. No.: 15/845,291

(22) Filed: Dec. 18, 2017

(65) Prior Publication Data
US 2019/0190815 A1 Jun. 20, 2019

(51) Int. Cl.
| | | |
|---|---|---|
| *G06F 15/173* | (2006.01) | |
| *H04L 12/751* | (2013.01) | |
| *H04L 12/725* | (2013.01) | |
| *H04L 12/24* | (2006.01) | |
| *H04L 12/851* | (2013.01) | |
| *H04L 12/707* | (2013.01) | |

(52) U.S. Cl.
CPC ............ *H04L 45/08* (2013.01); *H04L 41/147* (2013.01); *H04L 41/16* (2013.01); *H04L 45/22* (2013.01); *H04L 45/302* (2013.01); *H04L 47/2441* (2013.01)

(58) Field of Classification Search
None
See application file for complete search history.

(56) References Cited

U.S. PATENT DOCUMENTS

| | | | | |
|---|---|---|---|---|
| 7,720,959 B2* | 5/2010 | Karam | ................... | H04L 45/12 709/224 |
| 8,085,775 B1* | 12/2011 | Pappu | ................. | H04L 47/2441 370/392 |
| 9,929,949 B2* | 3/2018 | Mahadevan | ............ | H04L 45/02 |
| 2013/0128773 A1* | 5/2013 | Thubert | .................. | H04L 41/12 370/254 |

(Continued)

OTHER PUBLICATIONS

Stampa, et al., "A Deep-Reinforcement Learning Approach for Software-Defined Networking Routing Optimization", arXiv:1709.07080v1, 2017, 3 pages, arXiv.org.

(Continued)

*Primary Examiner* — Phuoc H Nguyen
(74) *Attorney, Agent, or Firm* — Behmke Innovation Group LLC; Kenneth J. Heywood; Jonathon P. Western

(57) ABSTRACT

In one embodiment, a controller in a network trains a deep reinforcement learning-based agent to predict traffic flows in the network. The controller determines one or more resource requirements for the predicted traffic flows. The controller assigns, using the deep reinforcement learning-based agent, paths in the network to the flows based on the determined one or more resource requirements, to avoid fragmentation of a flow during transmission of the flow through the network. The controller sends, to nodes in the network, assignment instructions that cause the flows to traverse the network via their assigned paths.

14 Claims, 11 Drawing Sheets

(56) References Cited

U.S. PATENT DOCUMENTS

| | | | |
|---|---|---|---|
| 2015/0109926 A1* | 4/2015 | Jin | H04W 40/22 |
| | | | 370/235 |
| 2015/0193695 A1* | 7/2015 | Cruz Mota | G06N 3/0454 |
| | | | 706/12 |
| 2016/0021011 A1* | 1/2016 | Vasseur | H04L 47/127 |
| | | | 370/235 |
| 2016/0021017 A1* | 1/2016 | Thubert | H04L 47/125 |
| | | | 370/235 |
| 2016/0105364 A1 | 4/2016 | Kanonakis et al. | |
| 2017/0054641 A1 | 2/2017 | Anerousis et al. | |
| 2017/0099226 A1* | 4/2017 | Vasseur | H04L 47/826 |
| 2017/0279839 A1 | 9/2017 | Vasseur et al. | |
| 2018/0359172 A1* | 12/2018 | Yadav | H04L 45/70 |

OTHER PUBLICATIONS

Valadarsky, et al., "A Machine Learning Approach to Routing", arXiv:1708.03074v1, 2017, 7 pages, arXiv.org.

Zorzi, et al., "Cognition-Based Networks: A New Perspective on Network Optimization Using Learning and Distributed Intelligence", IEEE Access, vol. 3, No. , pp. 1512-1530, 2015, IEEE.

Arulkumaran et al. "A Brief Survey of Deep Reinforcement Learning"; IEEE Signal Processing Magazine, Special Issue on Deep Learning for Image Understanding (Arxiv Extended Version); Sep. 28, 2017; pp. 1-16.

* cited by examiner

INSPIRED PATH COMPUTATION IN A NETWORK

TECHNICAL FIELD

The present disclosure relates generally to computer networks, and, more particularly, to inspired path computation in a network.

BACKGROUND

Path computation in a network generally refers to the task of determining how packets should flow through the network, subject to any number of predefined constraints. For example, path computation in a deterministic network, which guarantees the delivery of packets within a bounded time, may entail assessing constraints such as guaranteed packet delivery within the defined timeframe, fixed latency, and jitter very close to zero (e.g., microseconds to tens of milliseconds, depending on the application).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
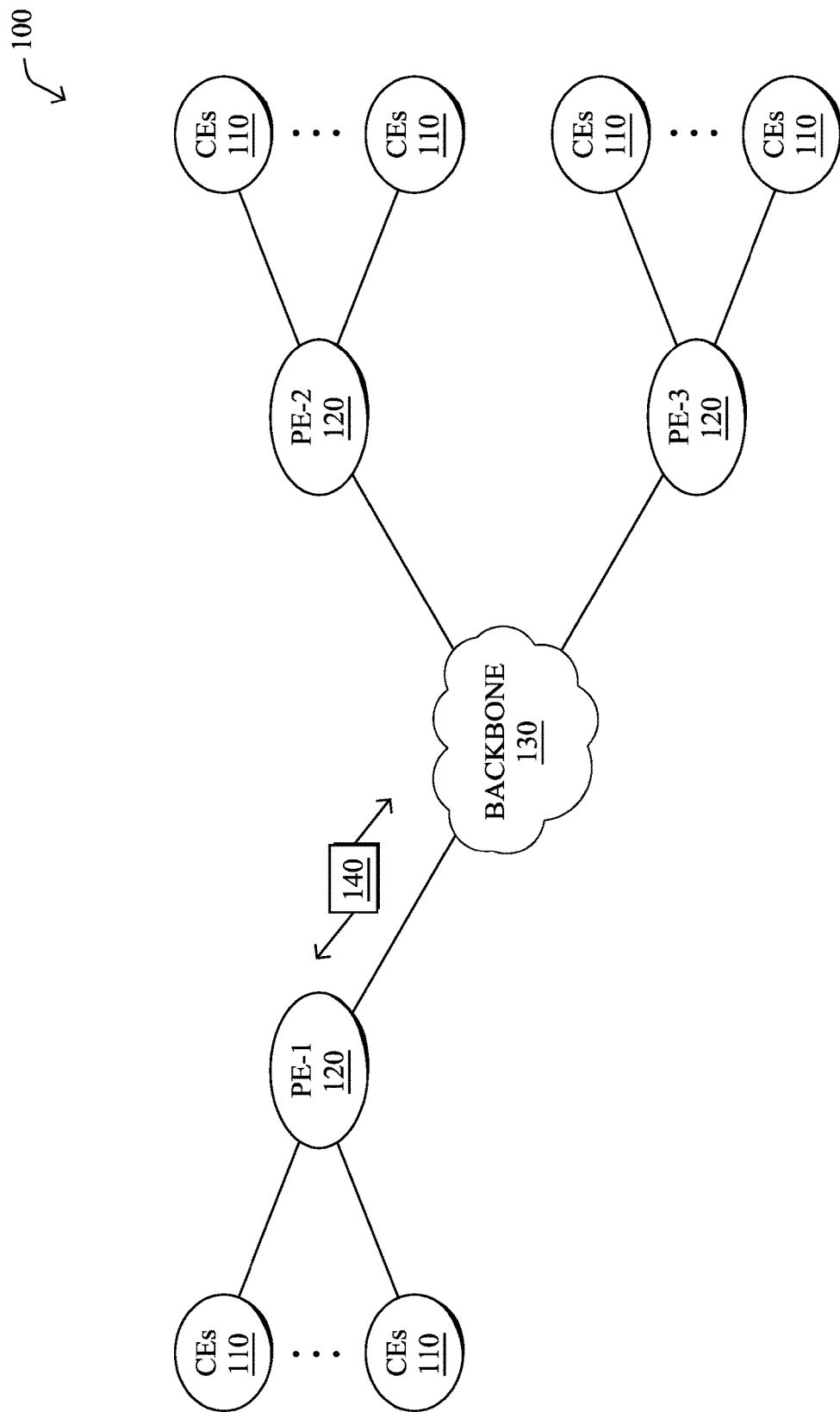
FIGS. 1A-1B illustrate an example communication network.

According to one or more embodiments of the disclosure, a controller in a network trains a deep reinforcement learning-based agent to predict traffic flows in the network. The controller determines one or more resource requirements for the predicted traffic flows. The controller assigns, using the deep reinforcement learning-based agent, paths in the network to the flows based on the determined one or more resource requirements, to avoid fragmentation of a flow during transmission of the flow through the network. The controller sends, to nodes in the network, assignment instructions that cause the flows to traverse the network via their assigned paths.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
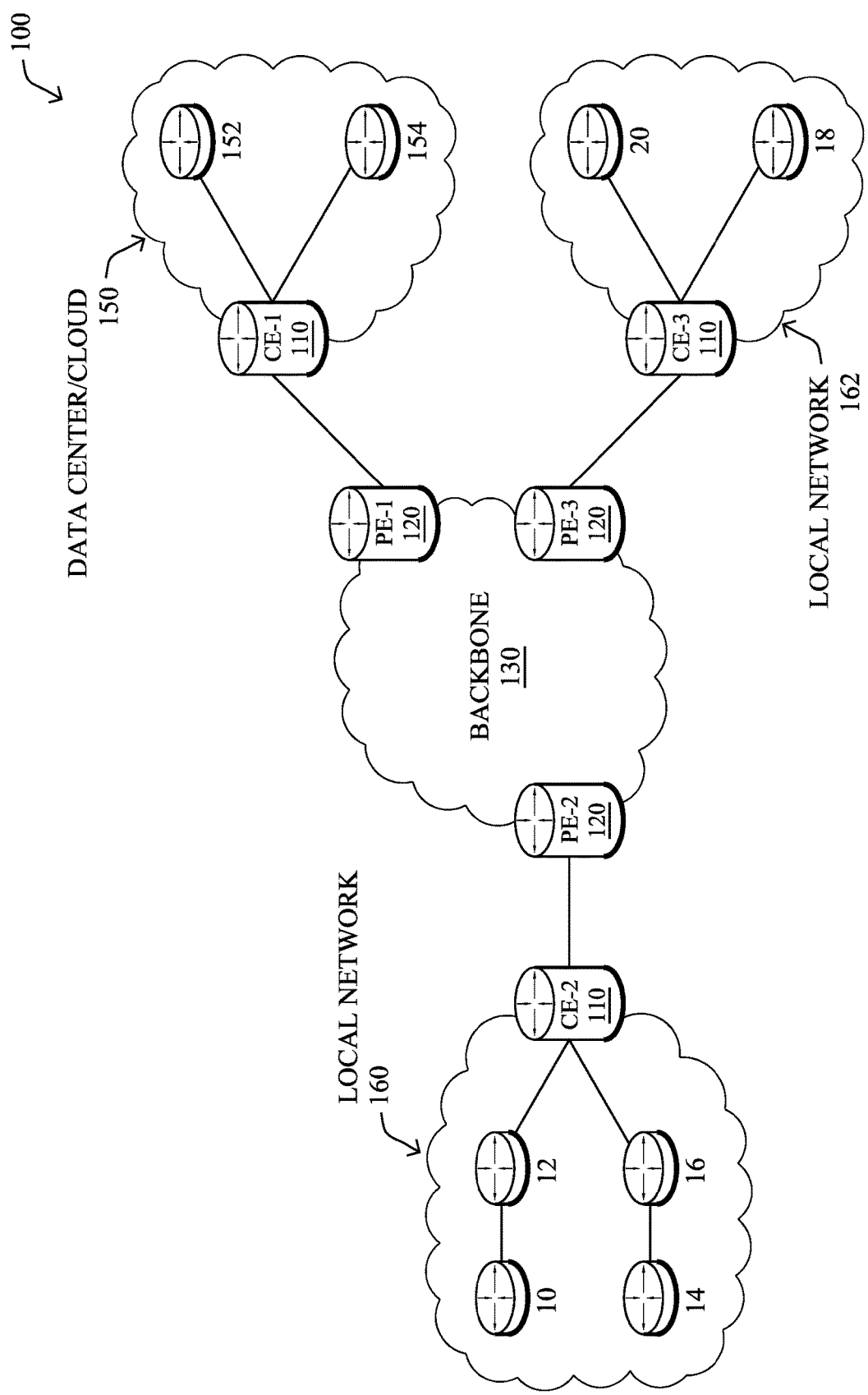

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, a path computation element (PCE), etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network.

Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
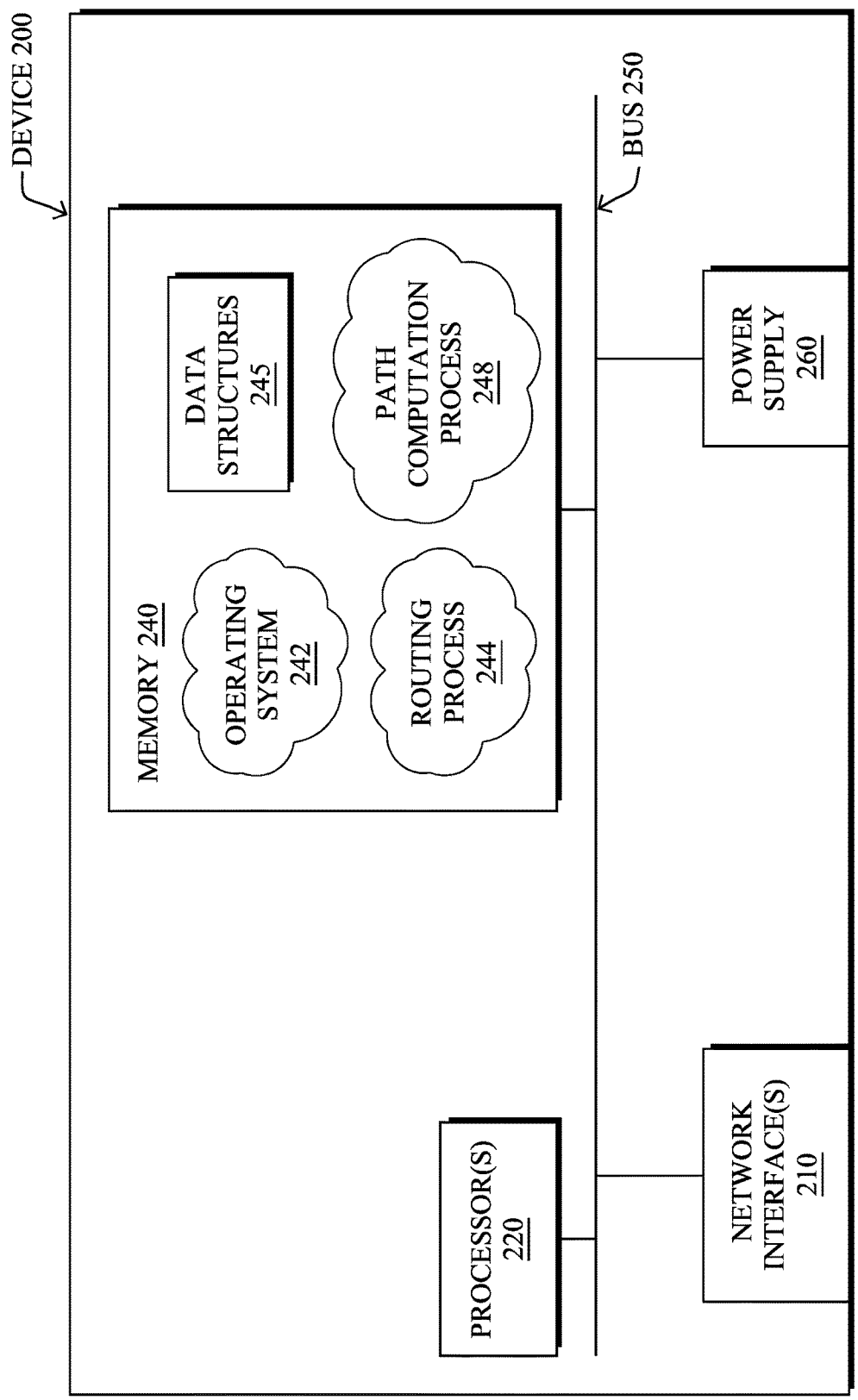
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a path computation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

Path computation process 248 includes computer executable instructions that, when executed by processor(s) 220, cause device 200 to perform path computation functions in a network. More specifically, device 200 may determine how network traffic flows between different nodes in a network. For example, path computation process 248 may determine that certain traffic in the network should traverse networking devices A→B→C, while other traffic in the network should traverse networking devices A→D→E.

In some embodiments, path computation process 248 may be configured to perform path computations in a software defined networking (SDN) environment. In general, SDN represents a relatively new approach to networking. In SDN, a controller may provide control over the various network devices using its southbound interface. Applications, in turn, may communicate their requirements to the SDN controller via the northbound application programming interfaces of the controller. Based on these requirements, path computation process 248 may assign traffic for a given application to a certain network path, to satisfy the networking requirements of the application.

Figure 3A:
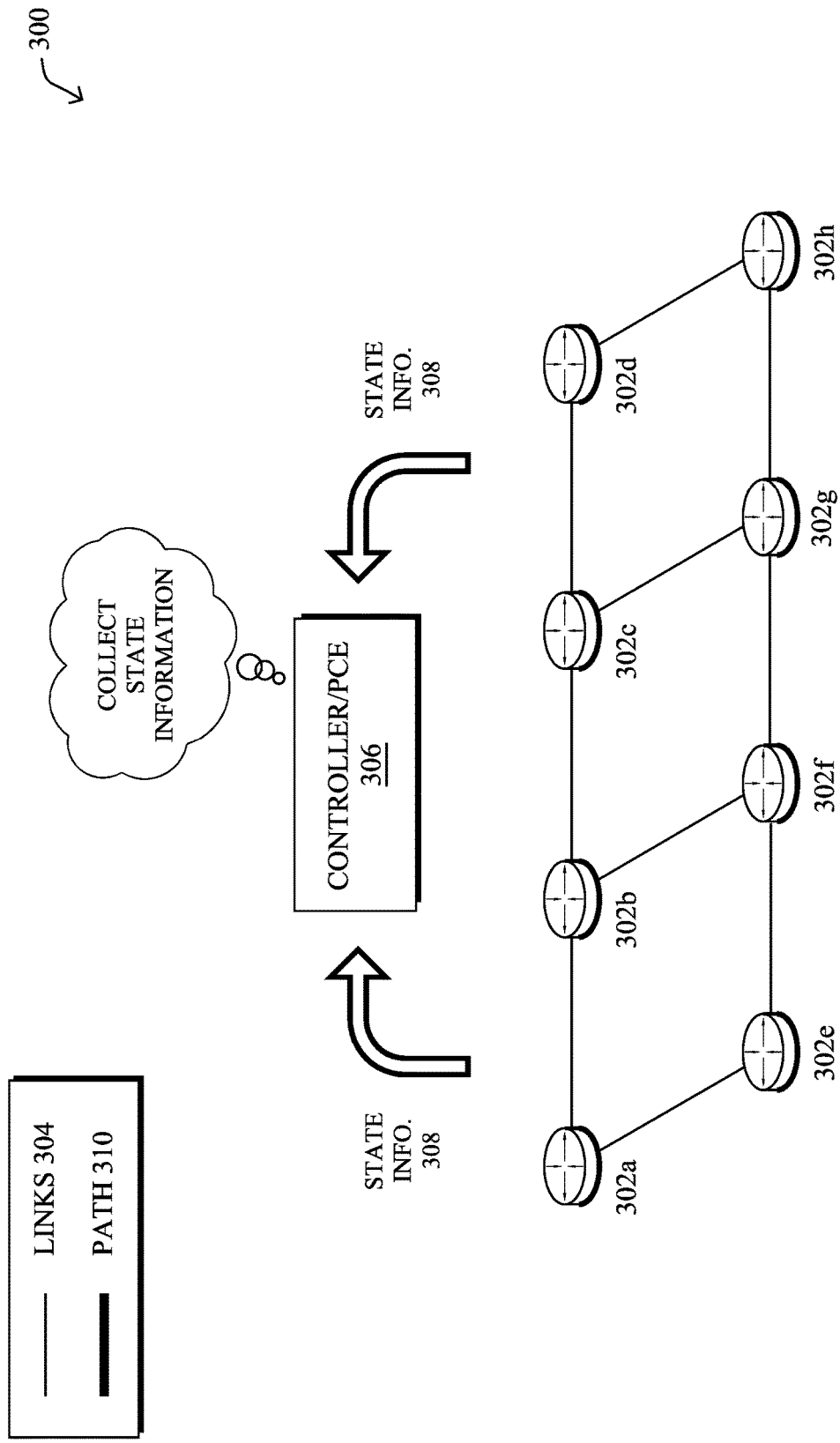
FIGS. 3A-3C illustrate an example of a flow being fragmented.
Figure 3B:
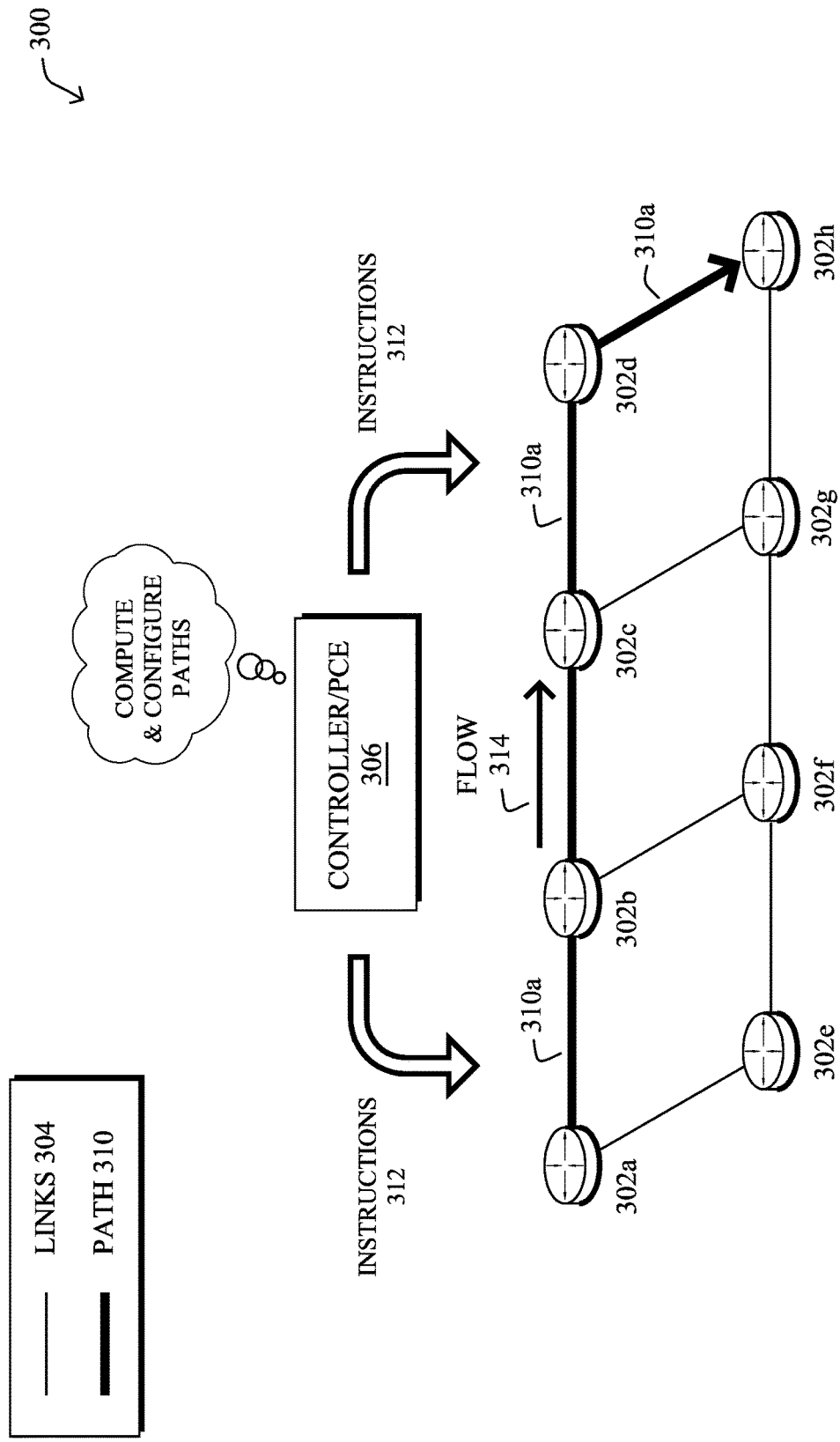
Figure 3C:
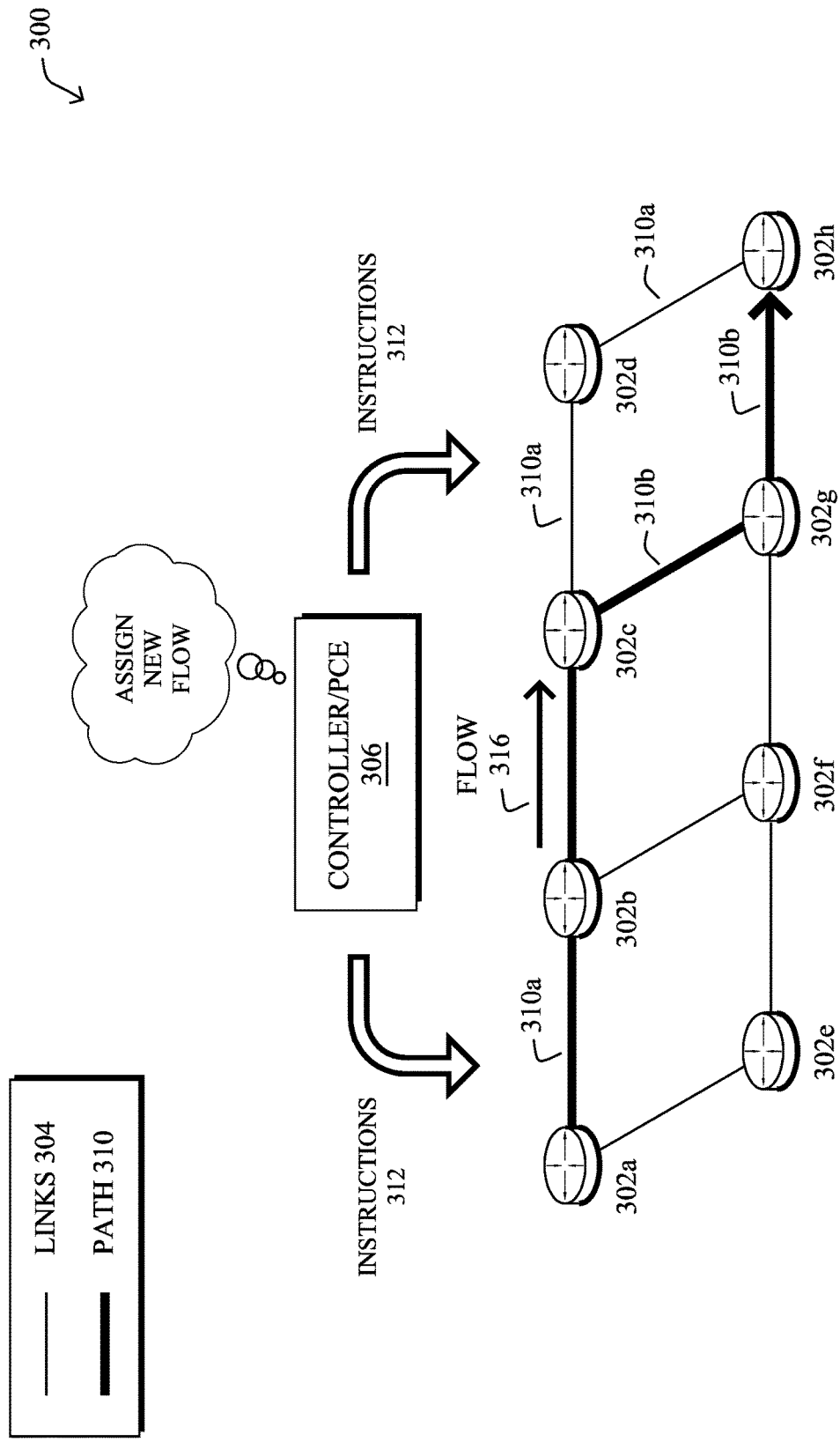

FIGS. 3A-3C illustrate an example network 300 of a flow being fragmented, in various embodiments. As shown, assume that there are a plurality of nodes 302 in network 300, such as nodes 302a-302h, which are interconnected via links 304. The combinations of links 304 may form a path through network 300 over which traffic may be sent from a source to a destination. Network 300 may further comprise a controller/path computation element (PCE) 306 that is in communication with nodes 302a-302h and provides supervisory control over nodes 302a-302h.

In FIG. 3A, controller/PCE 306 may receive state information 308 from nodes 302a-302h, to aid in its control over nodes 302a-302h. For example, state information 308 may include, but is not limited to, any or all of the following:

Local resource usage of a node 302—memory, CPU, queue availability, etc.

Link metrics for a link 304—delay, jitter, packet drops, etc.

Traffic information—application information, path information, bandwidth usage, etc.

In FIG. 3B, controller/PCE 306 may use the collected state information 308 from nodes 302a-302h, to compute and configure paths for the various application traffic in network 300. For example, assume that a given application is to send traffic flow 314 from node 302a to 302h in network 300. Based on the requirements of the application (e.g., as received via northbound APIs of controller/PCE 306), and the state of nodes 302a-302h, controller/PCE 306 may assign traffic flow 314 to path 310a, which traverses nodes 302a, 302b, 302c, 302d, and 302h. For example, traffic flow 314 may require latency below a defined threshold, based on the needs of its corresponding application. In turn, controller/PCE 306 may determine that path 310a is able to satisfy this requirement.

After computing a path for network 300, controller/PCE 306 may send instructions 312 to the affected nodes 302, to install the computed path. For example, controller/PCE 306 may send Path Computation Element Protocol (PCEP) messages to nodes 302a-302h, to install a path in network 300. PCEP can also be used by nodes 302 to request path computations from controller/PCE 306 as needed. For example, if node 302a receives traffic destined for node 302d, node 302a may request that controller/PCE 306 compute a path 310 from node 302a to node 302d. In turn, controller/PCE 306 may respond to the path request with path information for a path that traverses nodes 302a, 302b, 302c, and 302d.

As noted above, SDN typically relies on a PCE to establish routes with certain requirements/constraints. In the particular case of Deterministic Networking (DetNet) as exemplified by Time Sensitive Networking (TSN), reservations are placed along the paths for constant bit rate (CBR) flows. However, placing the initial flows is an NP-complete problem for a PCE. Adding more flows may also require a partial or a full re-computation of the solution, if there is no single path that can accommodate a new flow within its requirements/constraints, such as bandwidth or latency. This is because the existing flows end up fragmenting the bandwidth. Notably, when a large flow is requested, it may be that there is no path that can fully accommodate that flow, though the overall required bandwidth exists, it is fragmented over different links/potential paths resulting in dramatic system impairments.

For example, consider the case depicted in FIG. 3C in which controller/PCE 306 is to add a new flow 316 to network 300 that is also to be sent from node 302a to node 302h, similar to flow 314. However, it may be that the bandwidth requirements for flow 316 are greater than node 302d can currently support, meaning that new flow 316 cannot be fully assigned to path 310a. In particular, due to flow 314 and any other flows already flowing through node 302d, there may not be enough bandwidth or other resources available to simply send flow 316 via path 310a. In such a case, controller/PCE 306 may opt to fragment flow 316 across path 310a and another path 310b that avoids node 302d and instead traverses nodes 302a, 302b, 302c, 302g, and 302h. Alternatively, controller/PCE 306 may readjust the current flow-path assignments to accommodate the new flow 316, such as by moving the existing flow 314 to a different path, to make room for new flow 316 along path 310a.

The process of moving flows around and/or fragmenting a flow across multiple paths can be detrimental to an existing traffic. For example, if a flow is sent using TCP as the transport protocol, moving or fragmenting the flow may cause some of the packets of the flow to be received out of order. As would be appreciated, TCP uses sequence numbers to allow the receiver to reconstruct the message contained within a flow, as well as to track possible transmission errors. When TCP packets are received out of order, the receiver may take measures, such as sending a duplicate ACK message to the sender, or other corrective measures. Particularly in the case of time constrained flows, these additional steps can also cause the communication to violate its guaranteed delivery time frame.

Inspired Path Computation in a Network

The techniques herein introduce a deep reinforcement learning (DRL)-based approach to path computation in a network that assigns flows to paths so as to reduce or eliminate flow fragmentation. In some aspects, a path computation element (PCE) can be enhanced with a DRL agent that assesses the existing state of the network and outputs flow-path assignments that take into account the predicted flow requirements in the future. Doing so allows the PCE to assign flows to paths that are likely to be able to support the flow for its entire duration, thus avoiding fragmentation of the flow (i.e., moving the flow to a different path during transmission). In some aspects, a generative adversarial network (GAN) can be used by the PCE to generate synthetic training data for the DRL agent. This allows the DRL agent to be trained to account for even more situations than those that were previously observed in the network.

Specifically, according to one or more embodiments of the disclosure as described in detail below, a controller in a network trains a deep reinforcement learning-based agent to predict traffic flows in the network. The controller determines one or more resource requirements for the predicted traffic flows. The controller assigns, using the deep reinforcement learning-based agent, paths in the network to the flows based on the determined one or more resource requirements, to avoid fragmentation of a flow during transmission of the flow through the network. The controller sends, to nodes in the network, assignment instructions that cause the flows to traverse the network via their assigned paths.

Illustratively, the techniques described herein may be performed by hardware, software, and/or firmware, such as in accordance with the path computation process 248, which may include computer executable instructions executed by the processor 220 (or independent processor of interfaces 210) to perform functions relating to the techniques described herein, e.g., in conjunction with routing process 244.

Figure 4:
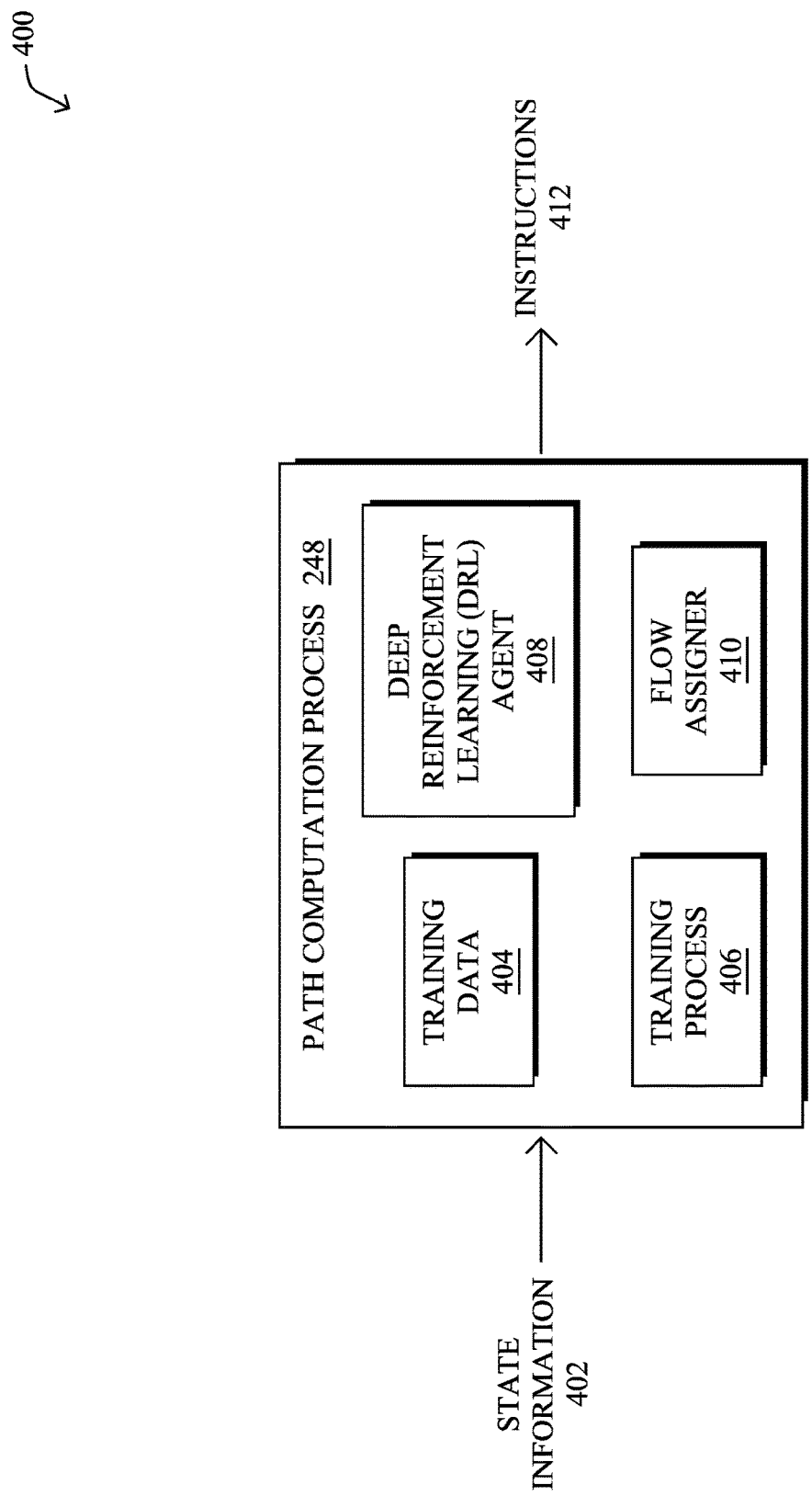
FIG. 4 illustrates an example architecture for performing path computation.

Operationally, FIG. 4 illustrates an example architecture 400 for performing path computation, according to various embodiments. As shown, path computation process 248 may include any or all of the following components: training data 404, a training process 406, a deep reinforcement learning (DRL) agent 408, and/or a flow assigner 410. Further, these components 404-410 may be implemented in a distributed manner or on a singular device. In the case of distributed implementations, the devices executing the components of path computation process 248 may be viewed as a single device/system. In addition, the functionalities of the components of architecture 400 may be combined, omitted, or implemented as part of other processes, as desired.

As described above, path computation process 248 may receive state information 402 from the network. This information may generally indicate the current state of the network, such as the flows present in the network, the available bandwidth across the different links or paths in the network, flow durations, and other such information about the network being overseen by path computation process 248.

In various embodiments, the techniques herein propose the use of a DRL agent 408 that learns how to act optimally given the system state information 402 and a reward function. As would be appreciated, DRL is a relatively new field of study that extends reinforcement learning with deep learning techniques. Generally, reinforcement learning entails an agent taking an action in an environment, based on the state of the environment, and then evaluating the results in view of a reward function. For example, in the simple case of applying reinforcement learning to video games, the reward function may serve to maximize the score in the game. In other words, reinforcement learning can learn the sequence of actions over time, in view of the environment states, to maximize the desired result.

Here, the reward function of DRL agent 408 may reward the assignment of flows to paths in the network by flow assigner 410 that do not result in the fragmentation of a flow when a new flow is added to the network. In other words, DRL agent 408 can use the state information 402 to reinforce decisions that placed new flows in the network without fragmentation and to penalize those decisions that resulted in fragmentation. In various embodiments, DRL agent 408 may leverage value functions, policy searching, or a hybrid of the two, to solve this reinforcement learning problem.

Deep learning can be used to extend reinforcement learning to higher dimensional problems, such as path computation in a network. In some embodiments, for example, training process 406 may train a deep neural network using training data 404 to approximate the appropriate policy and/or value functions of the reinforcement learning problem addressed by agent 408 (e.g., optimally assigning flows to avoid flow fragmentation). Typically, in the context of DRL, this can be performed using gradients and backpropagation. However, other suitable DRL techniques can be used, as desired.

In some embodiments, training data 404 may be based strictly on state information 402 observed in the communication network overseen by path computation process 248. For example, training data 404 may be populated with past NetFlow or IPFIX logs associated with previously performed traffic engineering (TE) operations in the communication network (e.g., up to multiple years of logs). In doing so, training process 406 can train DRL agent 408 to take actions (e.g., the assignment of flows to network paths) that will not result in flow fragmentation.

The responsiveness of path computation process 248 operating in a real-time environment can also be improved by pre-training DRL agent 408 so that the agent learns the basic characteristics of the communication network faster and with fewer samples. To this end, in some embodiments, training process 406 may also generate synthetic training data 404 that represents situations that were not actually observed in the communication network. For example, training process 406 may use a generative adversarial network (GAN), to generate synthetic training data in training data 404. In one embodiment, the inverse reinforcement learning problem (IRL), i.e. the problem of extracting a reward function given observed optimal behavior, can also be addressed in the computation with the current demand, if there is enough bandwidth in the network for both present and future needs.

Said differently, DRL agent 408 may operate in conjunction with flow assigner 410 to determine ways to position the incoming flows so that the (bad) situation of flow fragmentation and defragmentation is avoided or mitigated. During operation, DRL agent 408 may do so by learning how flows are established in a particular network, their usual lifetimes, and bandwidth and/or delivery timeframe requirements. Conditions whereby the requirements of a given flow cannot be accommodated, or can be provided that other flows are displaced, is considered as a bad outcome from the standpoint of the reward function. DRL agent 408 influences the selection of paths by flow assigner 410, in order to guarantee that future calls that DRL agent 408 learns to expect will find appropriate bandwidth available. In turn, flow assigner 410 may send instructions 412 to the affected nodes in the network, to cause the flows to traverse the network via their assigned paths.

In other words, new flows are let into the network and assigned to paths by path computation process 248, based on a prediction by DRL agent 408 of the future needs in the network. For instance, a low priority flow may be placed in a stretched path even though bandwidth is available of a shorter path if, during the requested lifetime of the flow, it is expected that a higher priority flow will need the bandwidth. DRL agent 408 learns and applies best strategies, adapting the reward function to the optimal behavior observed, e.g., by going around the center of the network.

Figure 5A:
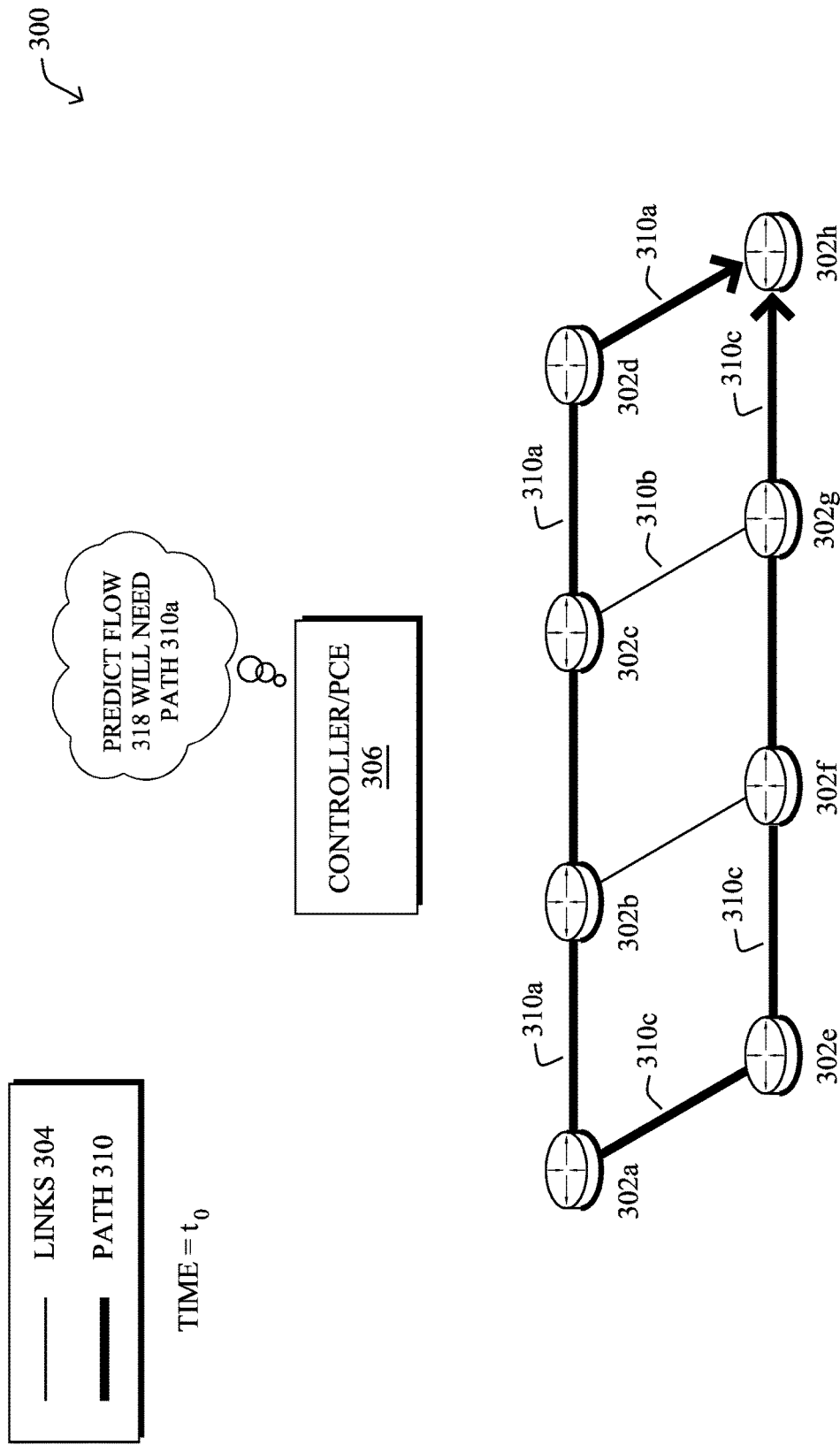
FIGS. 5A-5C illustrates an example of flows being assigned to paths in a network.
Figure 5B:
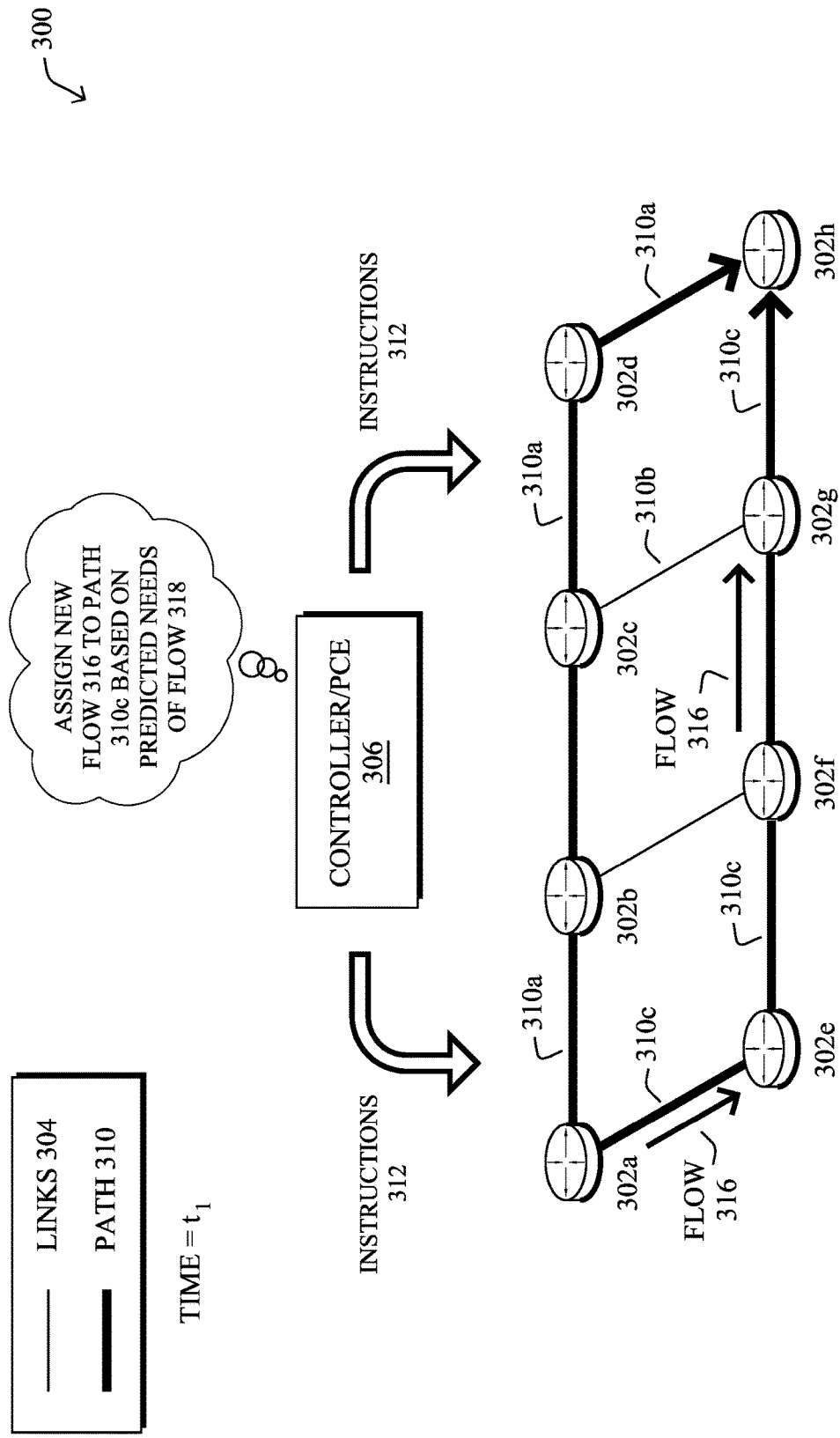
Figure 5C:
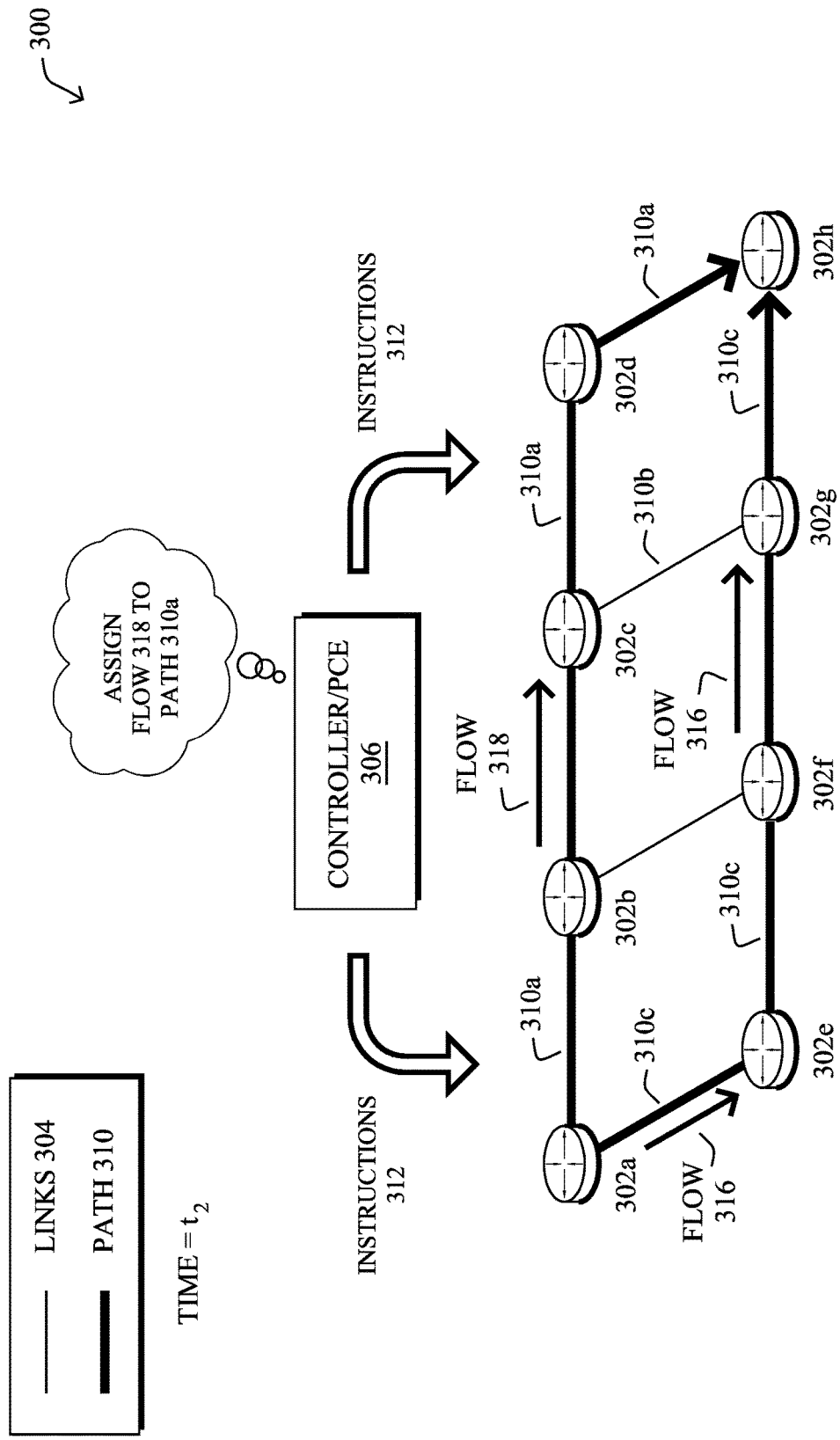

FIGS. 5A-5C illustrates an example of flows being assigned to paths in a network, according to various embodiments. Continuing the example of FIGS. 3A-3C, assume that controller/PCE 306 has been configured in accordance with architecture 400 shown in FIG. 4. Based on the state information collected by controller/PCE 306, as shown in FIG. 5A, the DRL agent of controller/PCE 306 may predict that a flow 318 that is not currently present in network 300 at time $T=t_o$ will be present in the near future. Such a prediction may be based, for example, on previously observed flows between a given source and destination, as well the timing information associated with these flows (e.g., when the flows occurred, their flow durations, etc.).

In addition to predicting the future presence of flow 318, controller/PCE 306 may also determine the one or more requirements of that flow. Such requirements may include, for example, the bandwidth requirements of the flow, a delivery timeframe for packets of the predicted flow, other requirements in terms of packet loss, jitter, latency, path redundancy, or the like.

From the requirements of flow 318, as well as the predicted timing of flow 318 and the other flows that will be present in the network during the duration of flow 318, controller/PCE 306 may determine that path 310a is the optimal path assignment for the predicted flow 318. In other words, controller/PCE 306 may determine that path 310a is the optimal path that can accommodate the requirements of upcoming flow 318 during its entire duration, while still leaving resources available for other flows.

In FIG. 3B, now assume that at time $T=t_1$, a new flow 316 is encountered by network 300 and that flow 316 is to be sent from node 302a to node 302h. Rather than simply assign flow 316 to path 310a, controller/PCE 306 may determine that doing so would cause fragmentation of the upcoming flow 318 and, thus, assign flow 316 to a different path. This may be particularly true if flow 316 has a lower priority than that of the upcoming flow 318. For example, controller/PCE 306 may opt to assign flow 316 to path 310c that includes nodes 302a, 302e, 302f, 302g, and 302h.

In FIG. 3C, at time $T=t_2$, assume that predicted flow 318 is now encountered in network 300. Accordingly, controller/PCE 306 may assign flow 318 to path 310a. If flow 316 is still present in network 300, it will not need to be moved to a different path, to accommodate flow 318. In addition, since flow 318 was already considered when controller/PCE 306 placed the other, existing flows in network 300, flow 318 can use path 310a during its duration without being fragmented.

Figure 6:
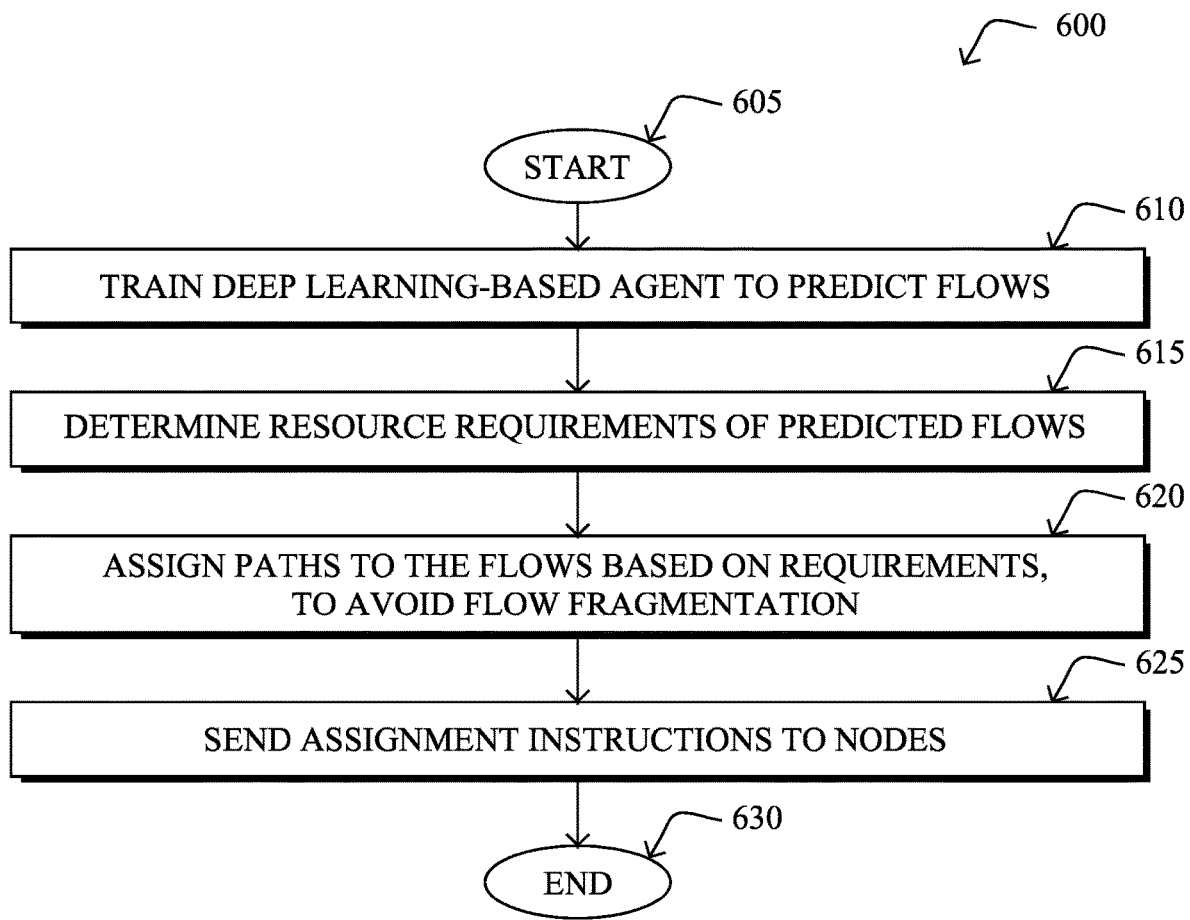
FIG. 6 illustrates an example simplified procedure for inspired path computation.

FIG. 6 illustrates an example simplified procedure for inspired path computation in a network, in accordance with one or more embodiments described herein. For example, a non-generic, specifically configured device (e.g., device 200) may perform procedure 600 by executing stored instructions (e.g., process 248), such as by acting as a controller/PCE over any number of distributed nodes in a network. The procedure 600 may start at step 605, and continues to step 610, where, as described in greater detail above, the controller may train a deep reinforcement learning (DRL)-based agent to predict flows in the network. For example, based on observed flows in the network, the agent may learn to expect a given flow at a particular time and for a certain duration.

At step 615, as detailed above, the controller may determine the one or more resource requirements of the predicted flows. For example, in a simple case, the controller may determine the bandwidth requirements and flow durations of the predicted flows. In more complex cases, the controller may also take into account factors such as latency, jitter, packet loss, bounded delivery times, or the like, of the flows.

Such requirements may be based on the requirements of the previously observed flows that were used to train the DRL agent.

At step 620, the controller may assign, using the deep reinforcement learning-based agent, paths in the network to the flows, as described in greater detail above. In particular, the controller may leverage the DRL agent to assign the flows to paths such that the determined one or more resource requirements of the flows are met and the assignments will avoid flow fragmentation. In other words, the controller may attempt to optimize the assignment of flows to paths at all times, in an attempt to maximize a reward function that rewards the agent when fragmentation is not needed as a result of the chosen assignments.

At step 625, as detailed above, the controller may send assignment instructions to the nodes in the network, to cause the flows to traverse the network via their assigned paths. For example, the controller may instruct one or more nodes to send a given flow via a selected path, as part of the placements that are believed by the DRL agent to be optimal. Of course, if flow fragmentation or flow re-assignment occurs as a result of the sent instructions, the DRL agent may learn from this poor outcome and adjust its processing in the future. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow a PCE to assign flows to network paths in an optimal way that minimizes or even eliminates the need to re-assign flows or fragment a new flow across multiple paths.

While there have been shown and described illustrative embodiments that provide for inspired path computation in a network, it is to be understood that various other adaptations and modifications may be made within the spirit and scope of the embodiments herein. For example, while certain embodiments are described herein with respect to using certain forms of machine learning for purposes of path computation, these models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    training, by a controller in a network, a deep reinforcement learning-based agent to predict traffic flows in the network, wherein the deep reinforcement learning-based agent uses a reward function determined using inverse reinforcement learning that penalizes when a traffic flow is fragmented across multiple paths in the network, and wherein the inverse reinforcement learning is used to determine the reward function based on observed behavior in the network in which flows are transmitted without being fragmented across different network paths;
    determining, by the controller, one or more resource requirements for the predicted traffic flows;
    assigning, by the controller and using the deep reinforcement learning-based agent, paths in the network to the flows based on the determined one or more resource requirements, to avoid fragmentation of a flow during transmission of the flow through the network; and
    sending, by the controller and to nodes in the network, assignment instructions that cause the flows to traverse the network via their assigned paths.

2. The method as in claim 1, wherein the network is a software defined network, and wherein the assignment instructions comprise Path Computation Element (PCE) Communication Protocol (PCEP) messages.

3. The method as in claim 1, wherein training the deep reinforcement learning-based agent to predict traffic flows in the network comprises:
    receiving state information from the nodes regarding the network; and
    using the received state information as training data to train the deep reinforcement learning-based agent.

4. The method as in claim 3, wherein training the deep learning-based agent to predict traffic flows in the network further comprises:
    generating synthetic training data by using the received state information as input to a generative adversarial network (GAN); and
    using the synthetic training data as part of the training data to train the deep reinforcement learning-based agent.

5. The method as in claim 1, wherein the one or more resource requirements comprise at least one of: a bandwidth requirement or a delivery timeframe.

6. An apparatus, comprising:
    one or more network interfaces to communicate with a network;
    a processor coupled to the network interfaces and configured to execute one or more processes; and
    a memory configured to store a process executable by the processor, the process when executed configured to:
        train a deep reinforcement learning-based agent to predict traffic flows in the network, wherein the deep reinforcement learning-based agent uses a reward function determined using inverse reinforcement learning that penalizes when a traffic flow is fragmented across multiple paths in the network, and wherein the inverse reinforcement learning is used to determine the reward function based on observed behavior in the network in which flows are transmitted without being fragmented across different network paths;
        determine one or more resource requirements for the predicted traffic flows;
        assign, using the deep reinforcement learning-based agent, paths in the network to the flows based on the determined one or more resource requirements, to avoid fragmentation of a flow during transmission of the flow through the network; and send, to nodes in the network, assignment instructions that cause the flows to traverse the network via their assigned paths.

7. The apparatus as in claim 6, wherein the network is a software defined network, and wherein the assignment instructions comprise Path Computation Element (PCE) Communication Protocol (PCEP) messages.

8. The apparatus as in claim 6, wherein the apparatus trains the deep reinforcement learning-based agent to predict traffic flows in the network by:
receiving state information from the nodes regarding the network; and
using the received state information as training data to train the deep reinforcement learning-based agent.

9. The apparatus as in claim 8, wherein the apparatus trains the deep learning-based agent to predict traffic flows in the network further by:
generating synthetic training data by using the received state information as input to a generative adversarial network (GAN); and
using the synthetic training data as part of the training data to train the deep reinforcement learning-based agent.

10. The apparatus as in claim 6, wherein the one or more resource requirements comprise at least one of: a bandwidth requirement or a delivery timeframe.

11. A tangible, non-transitory, computer-readable medium storing program instructions that cause a controller in a network to execute a process comprising:
training, the, a deep reinforcement learning-based agent to predict traffic flows in the network, wherein the deep reinforcement learning-based agent uses a reward function determined using inverse reinforcement learning that penalizes when a traffic flow is fragmented across multiple paths in the network, and wherein the inverse reinforcement learning is used to determine the reward function based on observed behavior in the network in which flows are transmitted without being fragmented across different network paths;
determining, by the controller, one or more resource requirements for the predicted traffic flows;
assigning, by the controller and using the deep reinforcement learning-based agent, paths in the network to the flows based on the determined one or more resource requirements, to avoid fragmentation of a flow during transmission of the flow through the network; and
sending, by the controller and to nodes in the network, assignment instructions that cause the flows to traverse the network via their assigned paths.

12. The computer-readable medium as in claim 11, wherein the network is a software defined network, and wherein the assignment instructions comprise Path Computation Element (PCE) Communication Protocol (PCEP) messages.

13. The computer-readable medium as in claim 11, wherein training the deep reinforcement learning-based agent to predict traffic flows in the network comprises:
receiving state information from the nodes regarding the network; and
using the received state information as training data to train the deep reinforcement learning-based agent.

14. The computer-readable medium as in claim 13, wherein training the deep learning-based agent to predict traffic flows in the network further comprises:
generating synthetic training data by using the received state information as input to a generative adversarial network (GAN); and
using the synthetic training data as part of the training data to train the deep reinforcement learning-based agent.

* * * * *